(12) United States Patent
    Chartrand et al.

(10) Patent No.: US 9,110,194 B2
(45) Date of Patent: Aug. 18, 2015

(54) SYSTEM AND METHOD FOR PROVIDING A TIME-BASED REPRESENTATION OF DATA

(75) Inventors: Timothy A. Chartrand, Spring, TX (US); Alan R. Wild, Houston, TX (US); Lucas J. Hilliard, Houston, TX (US); Stephen B. Wood, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 518 days.

(21) Appl. No.: 12/791,609

(22) Filed: Jun. 1, 2010

(65) Prior Publication Data

US 2011/0066405 A1    Mar. 17, 2011

Related U.S. Application Data

(60) Provisional application No. 61/242,166, filed on Sep. 14, 2009.

(51) Int. Cl.
    *G06G 7/48*    (2006.01)
    *G06G 7/56*    (2006.01)
    *G01V 11/00*   (2006.01)
    *E21B 43/16*   (2006.01)
    *G06F 17/50*   (2006.01)

(52) U.S. Cl.
    CPC ............. *G01V 11/00* (2013.01); *E21B 43/16* (2013.01); *G06F 17/50* (2013.01); *G06F 2217/16* (2013.01)

(58) Field of Classification Search
    CPC ......... E21B 47/00; E21B 47/12; E21B 43/26; E21B 43/16; G06F 17/50; G06F 2217/16; G01V 11/00
    USPC .................................... 703/6, 10, 11; 702/11
    See application file for complete search history.

(56) References Cited

U.S. PATENT DOCUMENTS

| | | |
|---|---|---|
| 5,594,842 A | 1/1997 | Kaufman et al. |
| 5,798,982 A | 8/1998 | He et al. |
| 6,244,375 B1 | 6/2001 | Norris et al. |
| 6,529,833 B2 | 3/2003 | Fanini et al. |
| 6,708,118 B2 | 3/2004 | Stark |
| 7,020,558 B2 | 3/2006 | Voutay et al. |
| 7,098,908 B2 | 8/2006 | Acosta et al. |
| 7,254,999 B2 | 8/2007 | Bostick, III |

(Continued)

FOREIGN PATENT DOCUMENTS

WO    WO 2007/056278    5/2007

OTHER PUBLICATIONS

Gret, Alexandre A., "Time-Lapse Monitoring with Coda Wave Interferometry", Jul. 19, 2004, Center for Wave Phenomena, Colorado School of Mines.*

Yuh, Sung H. et al., "A Feasibility Study of Time-Lapse Seismic Monitoring Using Stochastic Reservoir Models", 1999, SEG Expanded Abstracts.*

(Continued)

*Primary Examiner* — Kamini S Shah
*Assistant Examiner* — Cedric D Johnson
(74) *Attorney, Agent, or Firm* — ExxonMobil Upstream Research Company, Law Dept.

(57) ABSTRACT

A method is provided for obtaining a model of data describing a physical structure. The method comprises obtaining a set of time instance objects from a domain object. The method also comprises obtaining data describing a physical structure and time interval data related to the physical structure from each member of the set of time instance objects. The method additionally comprises creating a model of the data describing the physical structure in conjunction with the time interval data.

19 Claims, 5 Drawing Sheets

(56) References Cited

U.S. PATENT DOCUMENTS

| | | | |
|---|---|---|---|
| 8,727,017 B2 | 5/2014 | Hilliard et al. | |
| 8,731,872 B2 | 5/2014 | Czernuszenko et al. | |
| 8,731,873 B2 | 5/2014 | Walker et al. | |
| 8,731,875 B2 | 5/2014 | Hilliard et al. | |
| 8,731,887 B2 | 5/2014 | Hilliard et al. | |
| 2002/0091502 A1* | 7/2002 | Malthe-Sorenssen et al. | ... 703/2 |
| 2007/0219725 A1* | 9/2007 | Sun et al. | 702/13 |
| 2007/0255545 A1* | 11/2007 | Pita et al. | 703/10 |
| 2008/0080308 A1 | 4/2008 | Hornby | |
| 2008/0262809 A1 | 10/2008 | Carruthers et al. | |
| 2009/0198476 A1* | 8/2009 | Kim et al. | 703/2 |
| 2009/0238041 A1* | 9/2009 | Levin | 367/40 |

OTHER PUBLICATIONS

Alms, R. et al., "Space-Time Modeling of the Lower Rhine Basin Supported by an Object-Oriented Database", Oct. 28, 1997, Phys. Chem. Earth, vol. 23, No. 3, Elsevier Science Ltd.*

Sabella, Paolo et al., "Scientific Visualization: An Object-Oriented Approach to the Solid Modeling of Empirical Data", 1989, IEEE Computer Graphics & Applications.*

Granuarity, from Wikipedia, the free encyclopedia, retrieved on Aug. 28, 2014.*

Christopher, Louanne Marie, Forward Modeling of Compaction and Fluid Flow in the Ursa Region, Mississippi Canyon Area, Gulf of Mexico, Dec. 2006, Pennsylvania State University.*

* cited by examiner

100

200

300

SYSTEM AND METHOD FOR PROVIDING A TIME-BASED REPRESENTATION OF DATA

CROSS REFERENCE TO RELATED APPLICATION

This application claims the benefit of U.S. Provisional Application 61/242,166, filed 14 Sep. 2009, entitled System and Method for Providing a Time-Based Representation of Data, the entirety of which is incorporated by reference herein.

FIELD OF THE INVENTION

The present techniques relate to providing a time-based representation of data corresponding to physical objects. In particular, an exemplary embodiment of the present techniques relates to providing a four-dimensional (4D) time-aware model of a subsurface region.

BACKGROUND OF THE INVENTION

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Three-dimensional (3D) model construction and visualization have been widely accepted by numerous disciplines as a mechanism for analyzing, communicating, and comprehending complex 3D relationships. Examples of structures that can be subjected to 3D analysis include the earth's subsurface, facility designs and the human body.

With respect to providing visualizations of data regarding a 3D earth model, the current practices generally relate to processing and visualizing the geological data types such as seismic volumes, a geo-modeling grid, fault surfaces, horizon grids, well data and the like. In addition, it may be desirable to visually represent engineering and geoscience data types, which may be point or non-spatial data. Examples of such data types include drilling information, daily/monthly production data, geochemical or geomechanical analysis results, production measurements or the like.

The addition of time variability into the modeling of earth model data presents a challenging technical problem. A data set that includes 3D earth model data as well as time variability data may be referred to as 4D data. Known modeling techniques do not include the ability to provide integrated visualizations inclusive of a broad range of earth model data types in 4D visual form.

One known application provides the ability to model dynamic migration in a subsurface region by simulating changes in property values over time. In addition, this application provides simulation of model geometry changes over time. The time changing model geometries also allow for time changing surfaces and pointsets. However, this known application only allows the specification of model geometry, not the specification of associated surfaces and pointsets derived from the model geometry. Moreover, the surfaces and pointsets of the known application cannot be modified or created separately from the model geometry. Further, the known application only allows definition of the model geometry at an initial time. The user is not permitted to make further changes to the model geometry after it is defined. A method that effectively incorporates time-variability into the presentation of visual images of a structure such as a subsurface region is desirable.

U.S. Patent Application Publication No. 20080262809 relates to a method and system for modeling petroleum migration. This application purports to describe a method for modeling the migration of reactant in a subsurface petroleum system. The method comprises in part generating a mesh for an area of the petroleum system. The mesh comprises a plurality of nodes, with each node representing a point in space in the area. The method also comprises calculating one or more variables representing one or more physical characteristics at each node in the area and determining the migration of reactant in the petroleum system based on the one or more variables. The method is alleged to be able to process multiple reactant phases and non-static meshes.

U.S. Pat. No. 5,594,842 relates to an apparatus and method for real-time volume visualization. The disclosure allegedly describes a method and apparatus for providing real-time processing of voxels and real-time volume visualization of objects and scenes in a highly parallel and pipelined manner using a 3D skewed memory, a modular fast bus, two dimensional (2D) skewed buffers, 3D interpolation and shading of data points, and a ray projection cone. The method and apparatus purports to permit investigation and viewing of real-time static (3D) and dynamic (4D) high resolution volumetric data sets such as those found in medical imaging, biology, non-destructive quality assurance, scientific visualization, computer aided design (CAD), flight simulation, realistic graphics and the like. The method and apparatus implement ray-casting, a volume rendering technique. Viewing rays are cast from the viewing position into a cubic frame buffer. At evenly spaced sample points along each viewing ray, the data is tri-linearly interpolated using values of surrounding voxels. Central differences of voxels around the sample points yield a gradient which is used as a surface normal approximation. Using the gradient and the interpolated sample values, a local shading model is applied and a sample opacity is assigned. Finally, ray samples along the ray are composited into pixel values and provided to a display device to produce an image.

U.S. Pat. No. 6,708,118 relates to a system for utilizing geologic time volumes. The disclosure describes a system for utilizing a geologic time volume to investigate a portion of the earth in which a geologic time is selected and a search is made in the geologic time volume for locations having substantially the selected geologic time. Locations in the geologic time volume having substantially the geologic time are extracted from the geologic time volume. Locations having substantially the selected geologic time may be displayed to facilitate use of the geologic time volume by an interpreter.

U.S. Pat. No. 7,098,908 relates to a system and method for analyzing and imaging 3D volume data sets. A system and method is provided for analyzing and imaging 3D volume data sets. In one disclosed system, a ribbon section is produced which may include a plurality of planes projected from a polyline. The polyline may include one or more line segments preferably formed within a plane. The projected planes intersect the 3D volume data set and the data located at the intersection may be selectively viewed. The polyline may be edited or varied by editing or varying the control points which define the polyline. The disclosure also describes a method for tracking a physical phenomenon represented within the 3D volume data set. A plurality of planes may be successively displayed in the 3D volume data set from which points are digitized related to the structure of interest to create a spline curve on each plane. The area between the spline curves is interpolated to produce a surface representative of the structure of interest, which may for example be a fault plane described by the 3D volume data set. In this manner, the user can more easily and effectively visualize and interpret the features and physical parameters that are inherent in the 3D volume data set.

SUMMARY OF THE INVENTION

An exemplary embodiment of the present techniques comprises a method for obtaining a time-based model of data describing a physical structure. The method comprises obtaining a set of time instance objects from a domain object. The method also comprises obtaining data describing a physical structure and time interval data related to the physical structure from each member of the set of time instance objects. The method additionally comprises creating a model of the data describing the physical structure in conjunction with the time interval data.

One exemplary method comprises providing a visualization of the model of the data. The model of the data may relate to a particular requested time. According to the present techniques, a second model of data at a second particular requested time may be simultaneously provided. In addition, a uniform application of an algorithm across each member of the set of time instance objects may be provided.

In one exemplary embodiment, time interval data for multiple members of the set of time instance objects is not allowed to overlap. In an alternative embodiment, time interval data for multiple members of the set of time instance objects is allowed to overlap.

The time interval data of the time instance objects may comprise collected time information. In an exemplary embodiment, a non-changing physical structure is represented by a single time instance whose valid time range spans the maximum extents.

Dependent data that is associated with the data describing the physical structure may be included in the model of data describing the physical structure. The dependent data may comprise a property of the physical structure. Moreover, the dependent data may represent a subset of the physical structure of the model. A data output may be filtered based on the dependent data. Values of the dependent data may be calculated based on an interpolation scheme. A visualization of the dependent data may be provided. The dependent data may have associated time interval data. The time interval data associated with the dependent data may have a different granularity than the time interval data related to the physical structure. Moreover, the time interval data may represent a time interval ranging from less than one second to more than one billion years.

One exemplary embodiment of the present techniques relates to a computer system that is adapted to provide time-based models of data describing a physical structure. An exemplary computer system comprises a processor and a tangible, machine-readable storage medium that stores machine-readable instructions for execution by the processor. The machine-readable instructions comprise code that, when executed by the processor, is adapted to cause the processor to obtain a set of time instance objects from a domain object. The machine-readable instructions also comprise code that, when executed by the processor, is adapted to cause the processor to obtain data describing a physical structure and time interval data related to the physical structure from each of the set of time instance objects. The machine-readable instructions additionally comprise code that, when executed by the processor, is adapted to cause the processor to create a model of the data describing the physical structure in conjunction with the time interval data.

Another exemplary embodiment according to the present techniques relates to a method for producing hydrocarbons from an oil and/or gas field. The method comprises obtaining a set of time instance objects from a domain object. The method also comprises obtaining data describing a physical structure of the oil and/or gas field and time interval data related to the physical structure of the oil and/or gas field from each member of the set of time instance objects. The method additionally comprises creating a model of the data describing the physical structure of the oil and/or gas field in conjunction with the time interval data. Hydrocarbons are extracted from the oil and/or gas field using the model.

Yet another exemplary embodiment according to the present techniques relates to a method for providing a time-based representation of data describing a physical structure. The method comprises providing a set of data structures having data that defines a geometry of the physical structure. The method also comprises providing time interval data in conjunction with the set of data structures. The method additionally comprises changing the data that defines the geometry of the physical structure over time based on the time interval data.

DESCRIPTION OF THE DRAWINGS

Advantages of the present techniques may become apparent upon reviewing the following detailed description and drawings of non-limiting examples of embodiments in which.

DETAILED DESCRIPTION OF THE INVENTION

Figure 1:
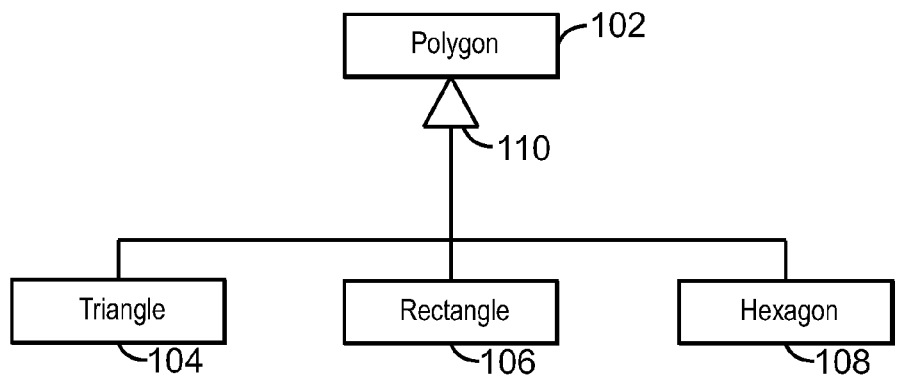
FIG. 1 is a block diagram useful in explaining inheritance in an object-oriented programming environment according to the present techniques.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "2D polygonset" refers to a collection of 2D planar faces located in 3D space that may have interior holes. Properties on a 2D polygonset may be used to color the faces.

As used herein, the term "3D seismic data volume" refers to a 3D volume of discrete seismic data points. The three dimensions relate to the spatial characteristics of the earth formation, two being horizontal length dimensions, and the third relating to depth in the earth formation, which can be represented by a length coordinate, or by a time coordinate such as the two-way travel time of a seismic wave from surface to a certain depth and back. In subsurface models, the discrete data points that make up a seismic data volume are often represented by a set of contiguous hexahedrons known as "cells" or "voxels", with each cell or voxel representing the volume surrounding a single data point. Each data point, cell, or voxel in a 3D seismic data volume typically has an assigned value ("data sample") of a specific seismic data attribute such as seismic amplitude, acoustic impedance, or any other seismic data attribute that can be defined on a point-by-point basis. Seismic data may comprise a structured 3D model defined by a point, 3-step vectors and a size in I,J,K space. Seismic data may be visually rendered or texture mapped on a surface with a variety of properties, such as color or opacity, for example.

As used herein, the term "4D surveying" refers to time-lapse seismic surveying that takes into account 4D seismics, wherein time between acquisitions represents a fourth data dimension. A 4D survey endeavors to model alterations in geological or geophysical characteristics of a given region of the earth by comparing seismic cubes corresponding to seismic acquisitions carried out at different times.

As used herein, the term "annotation" refers to a chart, text, or primitives used to represent non-spatial data or areas of high interest. By way of example, a chart might be used to denote production data, a textbox may be used to show user comments, or primitives may be used to denote areas of interest to a user.

As used herein, the term "cell" refers to a collection of faces, or a collection of nodes that implicitly define faces, where the faces together form a closed volume.

As used herein, the term "class" refers to a data structure that combines state (fields) and actions (methods and other function members) in a single unit. A class provides a definition for dynamically created instances of the class, also known as objects. Classes support inheritance and polymorphism mechanisms whereby derived classes can extend and specialize base classes.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

As used herein, the term "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present techniques are considered to include a tangible storage medium or distribution medium and prior art-recognized equivalents and successor media, in which the software implementations of the present techniques are stored.

As used herein, the terms "domain object" or "DomainObject" define a class hierarchy that encapsulates the physical description of a real-world object where the object may change over time. In addition, a domain object contains a collection of TimeInstanceObjects.

As used herein, the term "encapsulation" refers to a characteristic behavior of an object, which is to hide, or encapsulate, the internal structure of the data of the object and the algorithms by which its functions work. Instead of exposing these implementation details, objects present interfaces that represent their abstracts clearly with no extraneous information. The interface allows only a limited number of interactions between the outside world and an object. In C++ programming, most of these interactions involve invoking methods of the object. By invoking an object's methods, the outside world can tell the object to do something, but the details of how the object performs this action are not visible to the outside world. In effect, the object encapsulates its data and methods and hides them from the outside world.

As used herein, the term "face" refers to an arbitrary collection of points that form a surface.

As used herein, the term "geologic model" refers to a model that is topologically structured in I,J,K space but geometrically varied. A geologic model may be defined in terms of nodes and cells. Geologic models can also be defined via pillars. A geologic model may be visually rendered as a shell (without volume rendering).

As used herein, the term "grid2D" refers to a 2D structured regularly spaced array of 3D points. X, Y values may be calculated as needed from an origin and step vectors. Z values may vary independently and may therefore be stored explicitly. Grid2D data may be rendered as surfaces. Properties may be used to color the surface. Moreover, Grid2D data may appear to be quadrilaterals from above except that special "no values" parameters may be used to prevent certain Grid2D faces from being visually rendered.

As used herein, the term "I,J,K space" refers to a local horizontal reference frame for a geo-cellular model having specified integer coordinates for (i,j,k) for consecutive cells. By convention, K represents a vertical coordinate. I,J,K space may be used as a sample space in which each coordinate represents a single sample value without reference to a physical characteristic.

As used herein, the term "inheritance" refers to a characteristic behavior of an object, which is to allow reuse of pre-existing design and code. Moreover, inheritance allows previously written programs to be broadened by creating new superclasses and subclasses of objects. New objects may be described by how they differ from preexisting objects so that entirely new programs need not be written to handle new types of data or functions. General data and methods belong to a "base" class. More specific classes "inherit" these data and methods and define data and methods of their own. These specific classes are "derived" from the base class.

As used herein, the term "method" refers to functions or operations that can access a data structure such as an object.

As used herein, the term "node" refers to a collection of points defining one topological location in I,J,K space. Unless a split or fault condition is associated with the node, nodes have only one point.

The term "object" is used herein in the sense that it is normally understood as a computer science term of art. Thus, "object", refers to a single logical entity that may include a collection of data and methods for processing that data. Some data may be public while other data may be private. Similarly, some methods may be public while other methods may be private. Example methods may include constructors, destructors, get/set methods, and so on. Object-oriented programming (OOP) systems typically contain a large number of objects. An object is said to be an instance of a class of which it is a member. OOP enables objects to model virtually any real-world entity in terms of its characteristics, represented by data, and its behavior, represented by the operations it can perform using the data. In this way, objects can model concrete things like cells in a reservoir simulation and abstract concepts like numbers.

The terms "object-oriented programming" or "OOP" are used herein in the sense that it is normally understood as a computer science term of art. Moreover, the method and model of the present techniques may be implemented using OOP techniques. The most common programming languages for OOP are C, C++, C#, Java or the like. However, the practice of the present techniques is not limited to a particular OOP language. The design of OOP is well known to those skilled in the art of OOP systems and will only be described generally herein. In an object-oriented program, the focus is primarily on data and secondarily on the functions that access that data, rather than being primarily on functions and secondarily on the data they require. In contrast with a program that is described mainly by procedures with data input to and output from each procedure (such as a program written in FORTRAN or COBOL), an object-oriented program is organized around "objects."

As used herein, the term "path dependent objects" refers to data objects generally of one of two classifications: drilling/production information or reservoir/subsurface information. Path dependent objects may be represented as top and bottom measured depth ranges or specific measured depths. Path dependent objects may be visually rendered as cylinders or disks around a wellbore, and do not typically have individual properties.

As used herein, the term "point" refers to an X,Y,Z location in 3D space.

As used herein, the term "pointset" refers to collections of points, such as data points. Pointsets may be used to represent a fault or horizon. Pointsets may be visually rendered as a fixed scene size or as a pixel. Properties may be used to color the points or to change their size.

As used herein, the term "polyline" refers to an ordering of points. A polyline may be displayed as connected line segments (or cylinders) and may or may not be closed. Properties of polylines may be used to provide color or varying the thickness of the polyline and may be discrete or interpolated between known points.

As used herein, the term "polylineset" refers to a collection of polylines in which properties may be used to color the polylineset and be defined on a per polyline, point, or line segment basis. Polylinesets may represent horizons or faults in the upstream.

As used herein, the term "polymorphism" refers to a characteristic behavior of an object, which is to allow a request to be made of a software component without knowing detailed information about the composition of the software component. According to polymorphism, a software component receives a request and interprets it to determine, according to the variables and data of the software component, how to respond to the request.

As used herein, the term "primitive" refers to a basic geometric shape. Examples of 2D primitives include rectangles, circles, ellipses, polygons, points, lines or the like. Examples of 3D primitives include cubes, spheres, ellipsoids, cones, cylinders or the like.

As used herein, the term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to a characteristic or stored information related to an object. Application of the appropriate definition is intuitive to one skilled in the art of computer science.

As used herein, the terms "region" or "filter" refer to calculated or explicit subsets of a data type that represent an "on/off" selection. Regions or filters may be used to specify portions of an object to display or for some other operation.

As used herein, the term "seismic lines" refers to ordered lists of points used to define a path inside a 2D scene and extruded vertically to some specified height. Seismic line data may be visually rendered as a 2D ribbon. Seismic lines have a property defined at uniform intervals down an extrusion for each point.

As used herein, the term "simulation model" refers to an unstructured grid with collections of points, faces and cells.

As used herein, the terms "time instance object" or "TimeInstanceObject" define a class hierarchy that encapsulates the time dependent description of a real-world object at a given time (or time span).

As used herein, the term "triangulated surface" refers to a collection of points and triangles (the indices of three points in a collection of points). Triangulated surfaces may be visually rendered as surfaces. Properties may be used to color the surface.

As used herein, the term "unstructured surface" refers to a collection of points and polygonal faces. Unstructured surfaces may be visually rendered as surfaces. Properties may be used to color the surface.

As used herein, the terms "visualization engine" or "VE" refer to a computer component that is adapted to present a model and/or visualization of data that represents one or more physical objects.

As used herein, the term "well" refers to a surface location with a collection of wellbores. Wells may be visually rendered as a point or a glyph, along with a name.

As used herein, the term "wellbore" refers to a constituent underground path of a well and associated collections of path dependent data. A wellbore may be visually rendered as a collection of connected line segments or curves. Wellbores may also be visually rendered cylindrically with a radius.

As used herein, the term "welllog" refers to a collection of measured depth and value pairs along a wellbore. Welllog data may be visually rendered as coloration along a wellbore or as a separate line segment some distance from the path of the wellbore.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "processing", "computing", "obtaining", "predicting", "providing", "updating", "comparing", "creating", "determining", "adjusting" or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Embodiments of the present methodologies are described herein with respect to methods for conditioning process-based models to field and production data which include but are not limited to seismic data, welllogs and cores, outcrop data, production flow information, or the like.

An exemplary embodiment of the present techniques relates to a visualization engine or VE that is adapted to model and/or display complex 4D data in a useful way. A VE according to an exemplary embodiment of the present techniques may provide the ability to incorporate new and existing 4D workflows and visualize results in a common environment. In addition, an exemplary embodiment of the present techniques may provide 4D support for upstream data types in a single modeling and/or visualization environment.

An exemplary embodiment of the present techniques is not necessarily adapted to provide simulations of data or to predict changes in data. A VE according to an exemplary embodiment of the present techniques may use many different geometry data types at various times in a common way. In addition, a VE according to an exemplary embodiment of the present techniques may be adapted to provide interpolation between time steps to create a smooth animation of 4D data. Interpolation between properties and geometry with a constant topology (i.e. constant number of points, faces, cells, etc) can be done in a variety of ways most intuitively via linear interpolation of value or location (which ever is applicable) over time. Various mechanisms for supporting topology change animation can be employed like fade in/out of the inconsistent elements or specialized coloring. The object-oriented programming concept of inheritance is used to provide a VE according to an exemplary embodiment of the present techniques.

FIG. 1 is a block diagram useful in explaining inheritance in an object-oriented programming environment according to the present techniques. The diagram is generally referred to by the reference number 100.

In the example shown in FIG. 1, inheritance is illustrated using classes that implement three types of polygons. For this example, a polygon can be a triangle, rectangle, or hexagon. Referring to FIG. 1, these three polygons can be implemented using a base class called Polygon 102 and three derived classes called Triangle 104, Rectangle 106, and Hexagon 108. A small triangle 110 in FIG. 1 indicates that the classes below it inherit from the class above it.

As illustrated in FIG. 1, a Polygon 102 can be a Triangle 104, a Rectangle 106, or a Hexagon 108. Regardless of which it is, each object may have associated properties such as an "area" and a "color". Accordingly, the base class Polygon 102 contains data items called area and color. The three derived classes (the Triangle 104, the Rectangle 106, and the Hexagon 108) inherit these data items from the base class, Polygon 102.

Furthermore, methods that are the same for the three derived classes can be in the base class. For example, a base class method can define the data items "area" and "color", allocate memory for them, and initialize them. However, the area computation is different for each of the three types of polygon, so each derived class must provide its own method for this computation. Thus, Triangle 104, Rectangle 106, and Hexagon 108 each override a Polygon method called compute area that performs the operations required to compute its area, whatever these operations are. The outside world then could contain, for example, an array of Polygon objects, of which some are Triangle objects, some are Rectangle objects, and some are Hexagon objects. It could get the area of each of these objects by asking it to compute area. To obtain a particular polygon's area, the outside world would not have to know how it computed its area. In fact, the outside world would not need to know what kind of polygon it was.

Figure 2:
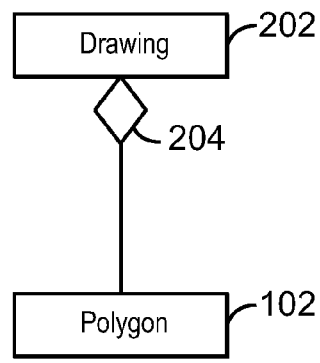
FIG. 2 is a block diagram useful in explaining containment in an object-oriented programming environment according to the present techniques.

FIG. 2 is a block diagram useful in explaining containment in an object-oriented programming environment according to the present techniques. The block diagram is generally referred to by the reference number 200. As shown in FIG. 2, objects in an object-oriented programming environment according to the present techniques may contain other objects or collections of objects. Moreover, a drawing object may contain one or more polygon objects of the class Polygon 102 described above with respect to FIG. 1.

In FIG. 2, a Drawing class 202 aggregates the Polygon class 102. A drawing could be implemented as an object that is an instance of the Drawing class 202. A diamond 204 indicates that an object of one class, Drawing 202, may contain a collection of an undefined number of objects of another class, Polygon 102. The number of Polygon 102 objects allowed would be zero or more, because the Drawing class 202 should not be required to contain a polygon.

For an object, the outside world is the application's higher-level code that uses the object to accomplish its objectives. Encapsulation, polymorphism, and inheritance allow the higher-level code to handle objects that are similar but not identical in type as if they actually were identical in type. This greatly simplifies higher-level code, making it practical to write code that performs more complex operations than are practical with a procedural language.

Figure 3:
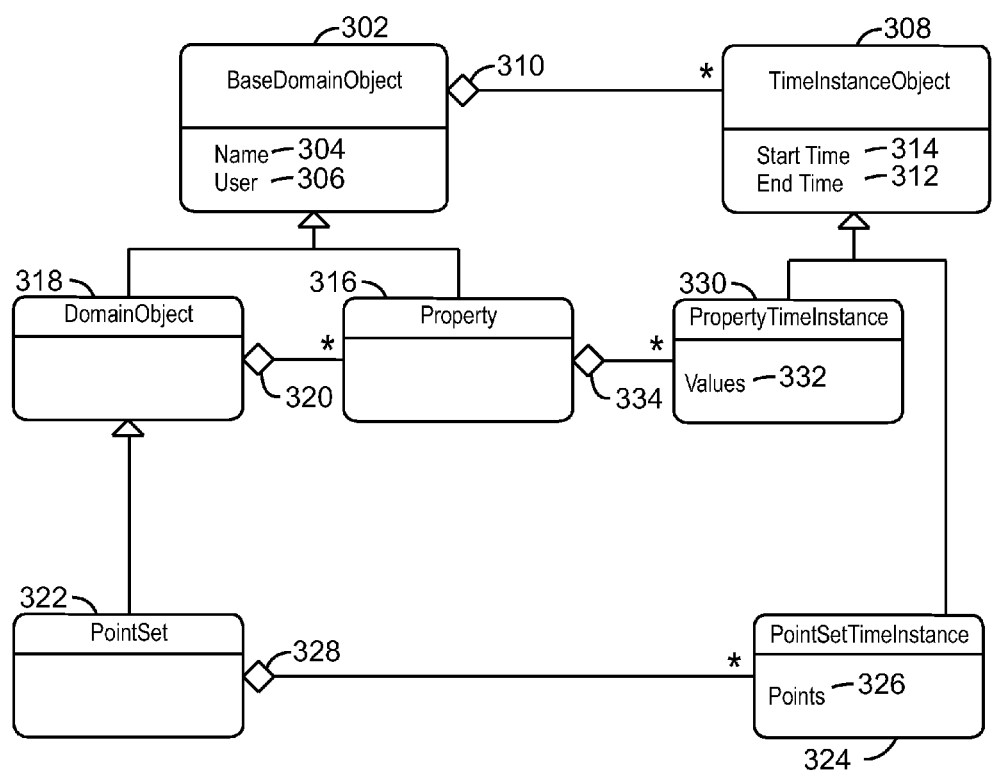
FIG. 3 is a block diagram showing a time-aware object-oriented programming environment according to exemplary embodiments of the present techniques.

FIG. 3 is a block diagram showing a time-aware object-oriented programming environment according to exemplary embodiments of the present techniques. The object-oriented programming environment is generally referred to by the reference number 300.

The object-oriented programming environment 300 includes a BaseDomainObject object 302. The BaseDomainObject object 302 has properties, which may include a Name property 304 and a User property 306. As explained in detail below, the BaseDomainObject 302 comprises a group or collection of time instance objects.

A TimeInstanceObject object 308 includes properties, which may include an EndTime property 312 and a StartTime property 314. According to an exemplary embodiment of the present invention, the BaseDomainObject object 302 may include a collection of zero or more TimeInstanceObject objects 308, as indicated by a diamond 310.

The StartTime property 314 and the EndTime property 312 may be utilized in a wide range of different ways. For example, each time instance object may comprise both a StartTime property and an EndTime property. In this scenario, the EndTime property of a first object has the same value as the StartTime property of a next successive object. The last time instance object may have an EndTime property of infinity.

In an alternative implementation, the StartTime property and EndTime property for each time instance object may be explicitly stated. This scenario allows the implementation of rules that allow or disallow time instance overlap.

In another alternative implementation, a time instance object has a CollectedTime property, as well as the StartTime property and the EndTime property. The CollectedTime property corresponds to a time when an observation about the physical parameter of the time instance object was made. The StartTime property and the EndTime property represent the range over which it is believed that particular instance definition is valid. Rules may be implemented to allow or disallow time instance overlap while maintaining CollectedTime uniqueness.

A Property object 316 inherits from the BaseDomainObject 302. A DomainObject object 318 inherits from the BaseDomainObject object 302. As indicated by a diamond 320, the DomainObject object 318 may comprise a collection of zero or more Property objects 316.

A PointSet object 322 inherits from the DomainObject 318. The PointSetTimeInstance object 324 inherits from the TimeInstanceObject object 308. The PointSetTimeInstance object 324 may comprise additional data, such as a Points collection 326. The PointSet object 322 may contain a collection of zero or more PointSetTimeInstance objects 324, as indicated by a diamond 328.

A PropertyTimeInstance object 330 inherits from the TimeInstanceObject object 308. In addition, the PropertyTimeInstance object 330 may comprise additional data, such as a Values collection 332. The Property object 316 may contain a collection of zero or more PropertyTimeInstance objects 330, as indicated by a diamond 334.

The integration of the TimeInstanceObject object 308, the PointSetTimeInstance object 324 and the PropertyTimeInstance object 330 into the object-oriented programming environment 300 greatly enhances the capability of a VE according to the present techniques to provide models and/or visualizations of 4D data. These enhancements are achieved by implementing each data type into two linked class hierarchies: a domain object hierarchy (including the DomainObject object 318) and a time instance object hierarchy (including the TimeInstanceObject object 308).

According to an exemplary embodiment of the present techniques, the domain object hierarchy contains relevant information that is common across time or, stated another way, independent of time. Things like object name, metadata, and collections of dependent domain objects are contained in the domain object hierarchy. The domain object hierarchy also contains a collection of its associated time instance objects. The time instance object hierarchy contains the data that is related to the time interval for which that instance of the domain object exists as well as the actual definition of that object at a given time (geometry or property values). In an exemplary embodiment of the present techniques, an inheritance hierarchy of some of the most derived classes in the VE is six levels deep.

According to an exemplary embodiment of the present techniques, physical structures of interest are described by derived classes that inherit from the domain object hierarchy and the time instance object hierarchy. For example, the Pointset object 322 class in the domain object hierarchy contains a collection of PointsetTimeInstance (which is the implementation of its inherited collection of TimeInstanceObjects) objects 324, as well as inheriting collections of the appropriate dependent data (for example, properties, regions, filters or the like). The PointsetTimeInstance object 324 class contains a collection of Points objects 326 and inherits information related to its time interval from the TimeInstanceObject object 308. Those of ordinary skill in the art will appreciate that the arrangement of objects shown in FIG. 3, including the specific domain objects and time instance objects, is given for purposes of example only. Other object configurations that include other domain objects and/or time instance objects may be selected based on system design considerations.

The present techniques relate to a VE that provides models and/or visualizations of objects in a 4D environment. Such a VE may provide models and/or visualizations of 3D data as it changes through time. One exemplary VE is adapted to provide models and/or visualizations of data that is useful in performing upstream activities in the oil and gas industry according to the object-oriented programming environment 300 (FIG. 3). Such an exemplary VE is adapted to provide time-aware models and/or visualizations of pointsets, polylines, polylinesets, 2D polygonsets and the like. Moreover, these models and/or visualizations may represent a portion of a subsurface environment as it changes over time. Such models and/or visualizations may comprise renderings of data types such as well data, wellbore data, welllog data or other path dependent objects.

A VE according to the present techniques may provide models and/or visualizations of Grid2D data, triangulated surface data, unstructured surface data or the like. Models and/or visualizations of seismic data and/or seismic line data may also be provided. Models and/or visualizations provided in accordance with the present techniques may also include non-seismic 3D model data such as geologic model data and/or simulation model data. A VE according to the present techniques may additionally provide models and/or visualizations of properties associated with objects and may display data using selected regions and/or filtering. In addition, models and/or visualizations of annotations and primitives may be provided. Those of ordinary skill in the art will appreciate that the objects listed herein are for purposes of example only and do not constitute an exhaustive or complete list of the object that may be provided with time-aware modeling/visualization support according to the present techniques. In addition, one advantage provided according to the present techniques is that application development efforts are simplified through the use of polymorphism and automatic synchronization of disparate objet time data in a single view.

According to the present techniques, an object-oriented programming environment integrates time-awareness as a property of a wide range of data objects. This integration of time-awareness allows a VE to provide time-aware models/visualizations of upstream data in an unprecedented manner. Moreover, a user is not required to build specific time-aware use cases outside the environment provided by a VE according to the present techniques. In particular, a VE in accordance with the present techniques provides a time object that may be used to provide time-aware models/visualizations of any object in the associated object-oriented programming environment. An exemplary time object provides the ability to update visualizations at practically any interval, ranging from less than one second to one billion years or more. Such a time range allows the creation of flexible types of workflows. In addition, standard time agnostic visualization support may be provided with limited time-related overhead.

In providing enhanced time-aware modeling and/or visualization capabilities, a VE in accordance with the present techniques may limit time-aware support for some data types to provide better modeling of physical phenomena. For example, time-aware support may not be provided for objects that cannot change over time such as well trajectories.

In one exemplary embodiment according to the present techniques, dependent data associated with a DomainObject object 318 may also be time-aware. As an example, properties associated with the DomainObject object 318 also contain their own time instances which define that property at multiple time instances with granularity potentially greater than the granularity associated by the TimeInstanceObject object 308 with the DomainObject object 318. This means a property can have multiple times per single geometry, which will improve the ability of a VE according to the present techniques to provide 4D models and/or visualizations for applications such as reservoir simulation or the like. This flexibility can be applied beyond properties and is also valid for regions and filters.

While providing a comprehensive uniform approach to time-awareness, a VE according to an exemplary embodiment of the present techniques may also support specialized time rules. For example, dependent objects of a wellbore must not have a time range outside of a valid time of the wellbore. Similarly, a property and other dependent data cannot be defined outside the time range of the time range associated with their DomainObject object 318. Another example of a built-in limitation of the time changing geometry is the awareness of an exemplary VE of the fact that initial wellbore locations do not change over time.

In one exemplary VE according to the present techniques, the time-awareness of the VE comprises a broad time range and with precision support. Such an exemplary VE may support time intervals of less than a second, which allows for fracture simulation. The exemplary VE may also support time ranges over billions of years. Moreover, a VE according to an exemplary embodiment of the present techniques is easily able to provide support for time ranges of virtually any size based on the available data.

An exemplary VE may provide improved methods of synchronizing time data in a viewer that displays 3D objects. The viewer time may be specified by a client and each domain object in the viewer may be automatically modeled and/or visualized at the specified time. No client synchronization is required. The client may have the ability to override a particular display of an object to show a time other than the viewer time in order to model/visualize multiple time instances of an object in the same viewer. Associated dependent object data also automatically synchronizes in the viewer (for example, properties, regions, and filters automatically conform to the appropriate time). One workflow enhanced greatly by this synchronization is automatic synchronization of time-aware annotations (for example, pie charts) in the 3D viewer. This ability allows a user to easily view production information across a reservoir at a given time.

A synchronized viewer time also allows components external to an exemplary VE to easily synchronize their view with the viewer time to present a common snapshot of time to users in a client application. This is most commonly done with respect to 2D charts. For example, the client application might be adapted to show a chart with time on the x-axis in synchronization with the corresponding annotations in the 3D viewer.

Another feature that can be enabled in a VE according to the present techniques is the uniform application of an algorithm across multiple time instances. As an example, this would easily allow for uniform smoothing to all time instances of a property.

Figure 4:
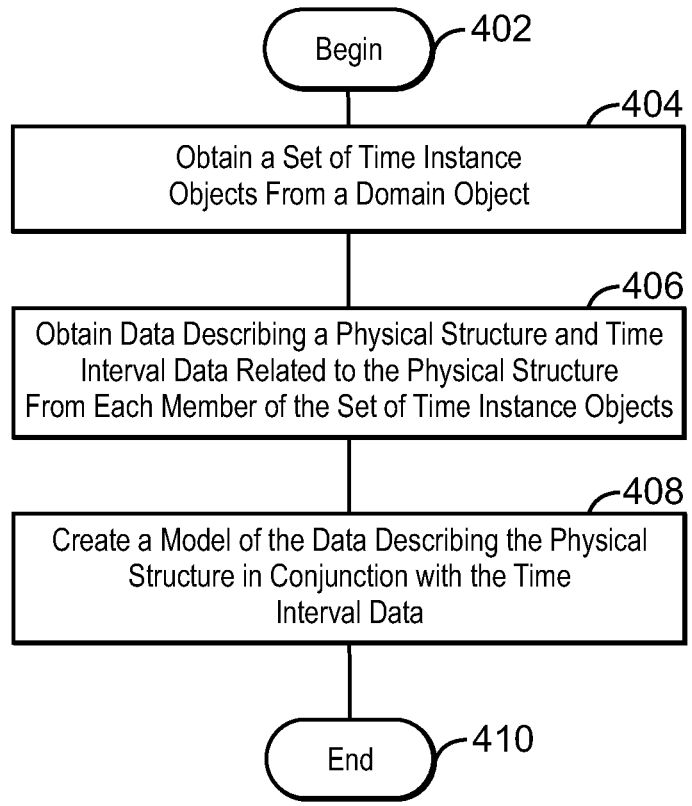
FIG. 4 is a process flow diagram showing a method for obtaining a model of data describing a physical structure according to exemplary embodiments of the present techniques.

FIG. 4 is a process flow diagram showing a method for obtaining a model of data describing a physical structure according to exemplary embodiments of the present techniques. The process is generally referred to by the reference number 400. The process begins at block 402.

At block 404, a set of time instance objects is obtained from a domain object. The set of time instance objects may be obtained by a computer component such as a processor or a software component of an object-oriented computer program.

At block 406, data describing a physical structure and time interval data related to the physical structure is obtained from each member of the set of time instance objects. A model of the data describing the physical structure in conjunction with the time interval data is created, as shown at block 408. At block 410, the process ends.

Figure 5:
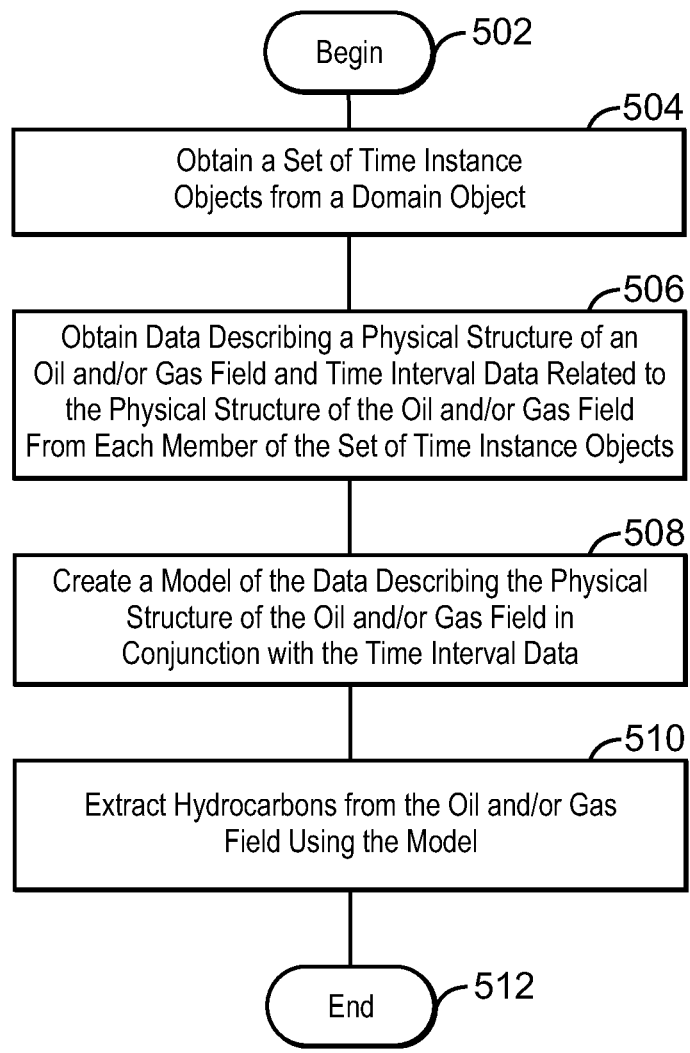
FIG. 5 is a process flow diagram showing a method for producing hydrocarbons from an oil and/or gas field according to exemplary embodiments of the present techniques.

FIG. 5 is a process flow diagram showing a method for producing hydrocarbons from an oil and/or gas field according to exemplary embodiments of the present techniques. The process is generally referred to by the reference number 500. The process begins at block 502. Those of ordinary skill in the art will appreciate that a VE according to the present techniques may facilitate the production of hydrocarbons by producing models and/or visualizations that allow geologists, engineers and the like to determine a course of action to take to enhance hydrocarbon production from a subsurface region. By way of example, a 4D visualization produced according to an exemplary embodiment of the present techniques may allow an engineer or geologist to determine a well placement to increase production of hydrocarbons from a subsurface region.

At block 504, a set of time instance objects is obtained from a domain object. The set of time instance objects may be obtained by a computer component such as a processor or a software component of an object-oriented computer program.

At block 506, data describing a physical structure of an oil and/or gas field and time interval data related to the physical structure of the oil and/or gas field is obtained from each member of the set of time instance objects. A model of the data describing the physical structure in conjunction with the time interval data is created, as shown at block 508. At block 510, hydrocarbons are extracted from the oil and/or gas field using the model. At block 512, the process ends.

Figure 6:
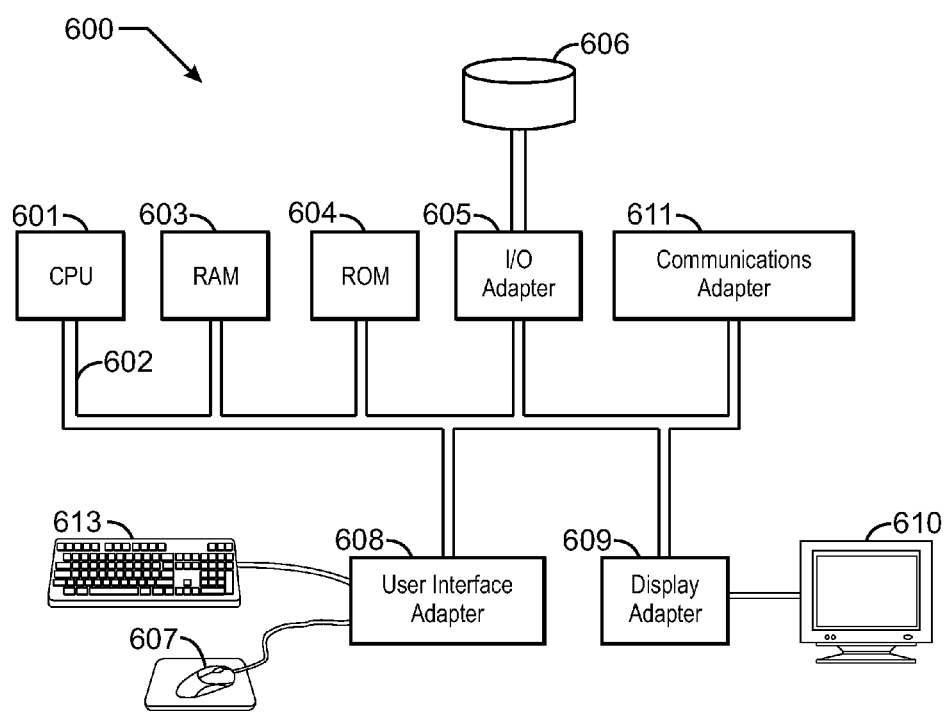
FIG. 6 is a block diagram of a computer system that may be used to perform a method for obtaining a model of data describing a physical structure according to exemplary embodiments of the present techniques.

FIG. 6 is a block diagram of a computer system that may be used to perform a method for obtaining a model of data describing a physical structure according to exemplary embodiments of the present techniques. A central processing unit (CPU) 601 is coupled to system bus 602. The CPU 601 may be any general-purpose CPU, although other types of architectures of CPU 601 (or other components of exemplary system 600) may be used as long as CPU 601 (and other components of system 600) supports the inventive operations as described herein. The CPU 601 may execute the various logical instructions according to various exemplary embodiments. For example, the CPU 601 may execute machine-level instructions for performing processing according to the operational flow described above in conjunction with FIG. 4 or FIG. 5.

The computer system 600 may also include computer components such as a random access memory (RAM) 603, which may be SRAM, DRAM, SDRAM, or the like. The computer system 600 may also include read-only memory (ROM) 604, which may be PROM, EPROM, EEPROM, or the like. RAM 603 and ROM 604 hold user and system data and programs, as is known in the art. The computer system 600 may also include an input/output (I/O) adapter 605, a communications adapter 611, a user interface adapter 608, and a display adapter 609. The I/O adapter 605, the user interface adapter 608, and/or communications adapter 611 may, in certain embodiments, enable a user to interact with computer system 600 in order to input information.

The I/O adapter 605 preferably connects a storage device(s) 606, such as one or more of hard drive, compact disc (CD) drive, floppy disk drive, tape drive, etc. to computer system 600. The storage device(s) may be used when RAM 603 is insufficient for the memory requirements associated with storing data for operations of embodiments of the present techniques. The data storage of the computer system 600 may be used for storing information and/or other data used or generated as disclosed herein. User interface adapter 608 couples user input devices, such as a keyboard 613, a pointing device 607 and/or output devices to the computer system 600. The display adapter 609 is driven by the CPU 601 to control the display on a display device 610 to, for example, display information or a representation pertaining to a portion of a subsurface region under analysis, such as displaying a generated 4D visual representation of a target area, according to certain exemplary embodiments.

The architecture of system 600 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A computer-implemented method for obtaining a time-based model of data describing a physical structure associated with a subsurface region, the method comprising:
   obtaining a set of time instance objects from a domain object, wherein the domain object encapsulates a physical description of the physical structure and the set of time instance objects encapsulates a time dependent description of the physical structure associated with the subsurface region at given times, wherein each time instance object is associated with a given time;
   obtaining data describing the physical structure and time interval data related to the physical structure from each member of the set of time instance objects;
   obtaining dependent data that is associated with the data describing the physical structure in the model of data describing the physical structure, wherein the dependent data has associated time interval data, the time interval data associated with the dependent data has a finer time granularity than the time interval data related to the physical structure, wherein a plurality of time interval data associated with the dependent data is associated with each time instance object;
   creating, using a computer, a time-based model of the data describing the physical structure in conjunction with the time interval data; and
   automatically synchronizing at least one member from the set of time instance objects with an associated dependent data to facilitate viewing production information across the physical structure at the given time using the time-based model.

2. The method recited in claim 1, comprising providing a visualization of the model of the data.

3. The method recited in claim 2, wherein the model of the data relates to a particular requested time.

4. The method recited in claim 3, comprising simultaneously providing a second model of data at a second particular requested time.

5. The method recited in claim 1, comprising providing a uniform application of an algorithm across each member of the set of time instance objects.

6. The method recited in claim 1, wherein time interval data for multiple members of the set of time instance objects are not allowed to overlap.

7. The method recited in claim 1, wherein time interval data for multiple members of the set of time instance objects are allowed to overlap.

8. The method recited in claim 1, wherein the time interval data of the time instance objects comprises collected time information.

9. The method recited in claim 1, wherein a non-changing physical structure is represented by a single time instance whose valid time range spans the maximum extents.

10. The method recited in claim 1, wherein the dependent data comprises a property of the physical structure.

11. The method recited in claim 1, wherein the dependent data represents a subset of the physical structure of the model.

12. The method recited in claim 1, comprising filtering a data output based on the dependent data.

13. The method recited in claim 1, comprising calculating values of the dependent data based on an interpolation scheme.

14. The method recited in claim 1, comprising providing a visualization of the dependent data.

15. The method recited in claim 1, wherein the time interval data may represent a time interval ranging from less than one second to more than one billion years.

16. The method recited in claim 1, comprising calculating time values based on time data via an interpolation scheme.

17. The method recited in claim 16, comprising providing a smooth animation of a visual change to the time-based model using the time values.

18. A computer system that is adapted to obtain a time-based model of data describing a physical structure associated with a subsurface region, the computer system comprising:
   a processor; and
   a non-transitory, machine-readable storage medium that stores machine-readable instructions for execution by the processor, the machine-readable instructions comprising:
   code that, when executed by the processor, is adapted to cause the processor to obtain a set of time instance objects from a domain object, wherein the domain object encapsulates a physical description of the physical structure associated with a subsurface region and the set of time instance objects encapsulates a time dependent description of the physical structure at given times, wherein each time instance object is associated with a given time;
   code that, when executed by the processor, is adapted to cause the processor to obtain data describing a physical structure and time interval data related to the physical structure from each member of the set of time instance objects;
   code that, when executed by the processor, is adapted to cause the processor to obtain dependent data that is associated with the data describing the physical structure in the model of data describing the physical structure, wherein the dependent data has associated time interval data, the time interval data associated with the dependent data has a finer time granularity than the time interval data related to the physical structure, wherein a plurality of time interval data associated with the dependent data is associated with each time instance object;
   code that, when executed by the processor, is adapted to cause the processor to create a time-based model of the data describing the physical structure in conjunction with the time interval data; and
   code that, when executed by the processor, is adapted to cause the processor to automatically synchronize at least one member from the set of time instance objects with an associated dependent data to facilitate viewing production information across the physical structure at the given time using the time-based model.

19. A method for producing hydrocarbons from an oil and/or gas field, the method comprising:
   obtaining a set of time instance objects from a domain object, wherein the domain object encapsulates a physical description of the physical structure associated with a subsurface region in the oil and/or gas field and the set of time instance objects encapsulates a time dependent description of the physical structure at given times, wherein each time instance object is associated with a given time;
   obtaining data describing the physical structure of the oil and/or gas field and time interval data related to the physical structure of the oil and/or gas field from each member of the set of time instance objects;
   obtaining dependent data that is associated with the data describing the physical structure in the model of data describing the physical structure, wherein the dependent data has associated time interval data, the time interval data associated with the dependent data has a finer time granularity than the time interval data related to the physical structure, wherein a plurality of time interval data associated with the dependent data is associated with each time instance object;
   creating, using a computer, a model of the data describing the physical structure of the oil and/or gas field in conjunction with the time interval data;
   automatically synchronizing at least one member from the set of time instance objects with an associated dependent data to facilitate viewing production information across the physical structure at the given time using the time-based model; and
   extracting hydrocarbons from the oil and/or gas field using the model.

* * * * *